United States Patent [19]
Sato et al.

[11] 4,292,509
[45] Sep. 29, 1981

[54] INDICATOR FOR TAPE RUNNING DIRECTION AND TAPE REMNANT AMOUNT

[75] Inventors: Masanobu Sato; Ken Satoh; Toshihiro Nakao; Kenzi Furuta, all of Hachioji, Japan

[73] Assignee: Olympus Optical Co., Ltd., Tokyo, Japan

[21] Appl. No.: 936,688

[22] Filed: Aug. 25, 1978

[30] Foreign Application Priority Data

Sep. 30, 1977 [JP] Japan .............................. 52/117561

[51] Int. Cl.³ .............................................. G06M 3/14
[52] U.S. Cl. ...................... 235/92 MP; 235/92 NG; 235/92 EV; 235/92 EA; 235/92 CA; 360/137
[58] Field of Search ....... 235/92 MP, 92 EV, 92 DN, 235/92 CA, 92 EA, 92 NG; 360/72, 137; 340/271; 364/705

[56] References Cited

U.S. PATENT DOCUMENTS

| | | | |
|---|---|---|---|
| 3,834,648 | 9/1974 | Rose et al. | 235/92 DN |
| 3,866,120 | 2/1975 | Ford | 235/92 EA |
| 3,906,345 | 9/1975 | Bertolasi | 235/92 EA |
| 4,097,726 | 6/1978 | Satoh et al. | 235/92 DN |
| 4,167,787 | 9/1979 | Satoh et al. | 364/705 |

Primary Examiner—Joseph M. Thesz

[57] ABSTRACT

An indicator for tape running direction and tape remnant amount is provided which comprises a ring counter clocked by a sensing pulse corresponding to the rotation of a take-up reel, a counter for providing count value corresponding to the period of the sensing pulse, comparators each for comparing the count value of the counter with reference data, gate circuits which are connected to the output circuits of the ring counter and controlled by the comparators, and a display unit which receives the output pulses of the gate circuits and includes a plurality of decimal points for indicating the tape running direction and the tape remnant amount. The output signals of the ring counter are shifted corresponding to the tape running direction. The number of signal circuits of the output pulses led from the gate circuit to the display unit depends on the result of the comparison by the comparators. The glint of each decimal point is progressively shifted flashing in the direction corresponding to the tape running direction. The moving range of the glint depends on the tape remnant amount.

17 Claims, 7 Drawing Figures

INDICATOR FOR TAPE RUNNING DIRECTION AND TAPE REMNANT AMOUNT

BACKGROUND OF THE INVENTION

The invention relates to an indicator for tape running direction and tape remnant amount by using a character display unit for displaying the tape running amount used in a tape recorder.

Generally, in a cassette type tape recorder, a cassette half is fully housed in the tape recoder. For this, it is very difficult to catch the running direction of the tape being used and the tape remnant amount when the tape recoder is not provided with an indicator for tape running direction and tape remnant amount.

For an indicator for tape running direction, there has been proposed an indicator in which the head of a tape take-up axis is marked or another indicator which is mechanically operable interlocking with the take-up axis. On of the conventional indicators for tape remnant amount is of a type in which an electrical amount corresponding to the rotational speed of a tape supply or a take-up reel is analogously displayed by means of an ammeter. The tape remnant amount may be indicated by using a tape counter. However, in this case, if the relation between the tape remnant amount and the numerical value indicated by the counter is not previously checked for the tape used, it is impossible to know the tape remnant amount from the indication by the tape counter. If such a relation is previously checked, it is difficult to directly know the tape remnant amount from the counter indication unless an operator is accustomed to the handling of the tape recorder.

In recent years, because of a remarkable improvement of digital electronic devices, we can easily and cheaply procure digital electronic parts such as digital display devices and counter ICs. This enables the digital display devices to be applied for counters to indicate the tape running amount of the tape recorder or indicators for indicating a voltage level of a battery. However, there has been no electronic display device in which the running amount, the tape running direction and the tape remnant amount may be displayed by a single device.

SUMMARY OF THE INVENTION

Accordingly, an object of the invention is to provide an indicator for tape running direction and tape remnant amount in which the tape running direction and tape remnant amount may be indicated by using a display unit already assembled for tape counting or other purposes.

To achieve the object of the invention, there is provided an indicator for tape running direction and tape remnant amount comprising: display means having a plurality of digit display sections; sensing means for providing a sensing signal corresponding to the rotation of a tape reel; running indication signal generating means for providing signals corresponding to the tape running direction; gate circuit means for selecting, in relation to the tape remnant amount, the signals derived from the running indication signal generating means; drive means for sequentially driving the digit display section in accordance with the signals selected by the gate circuit means; counter means which counts a clock signal and is reset by the sensing signal from the sensing means; and comparing means in which a count value of the counter means and a reference data corresponding to a fixed tape remnant amount are compared and the result of the comparison is used to control the selection operation of the gate circuit means.

With such an arrangement, the tape running direction and the tape remnant amount may both be indicated by means of the display means provided for other purposes than display of the tape running direction.

Other objects and features of the invention will be apparent from the following description taken in connection with the accompanying drawings, in which:

DESCRIPTION OF THE PREFERRED EMBODIMENTS

Reference is now made to FIGS. 1 to 5 for explaning preferred embodiments of the invention. Throughout the description in the specification, like reference symbols will be used to designate like or equivalent portions.

Figure 1:
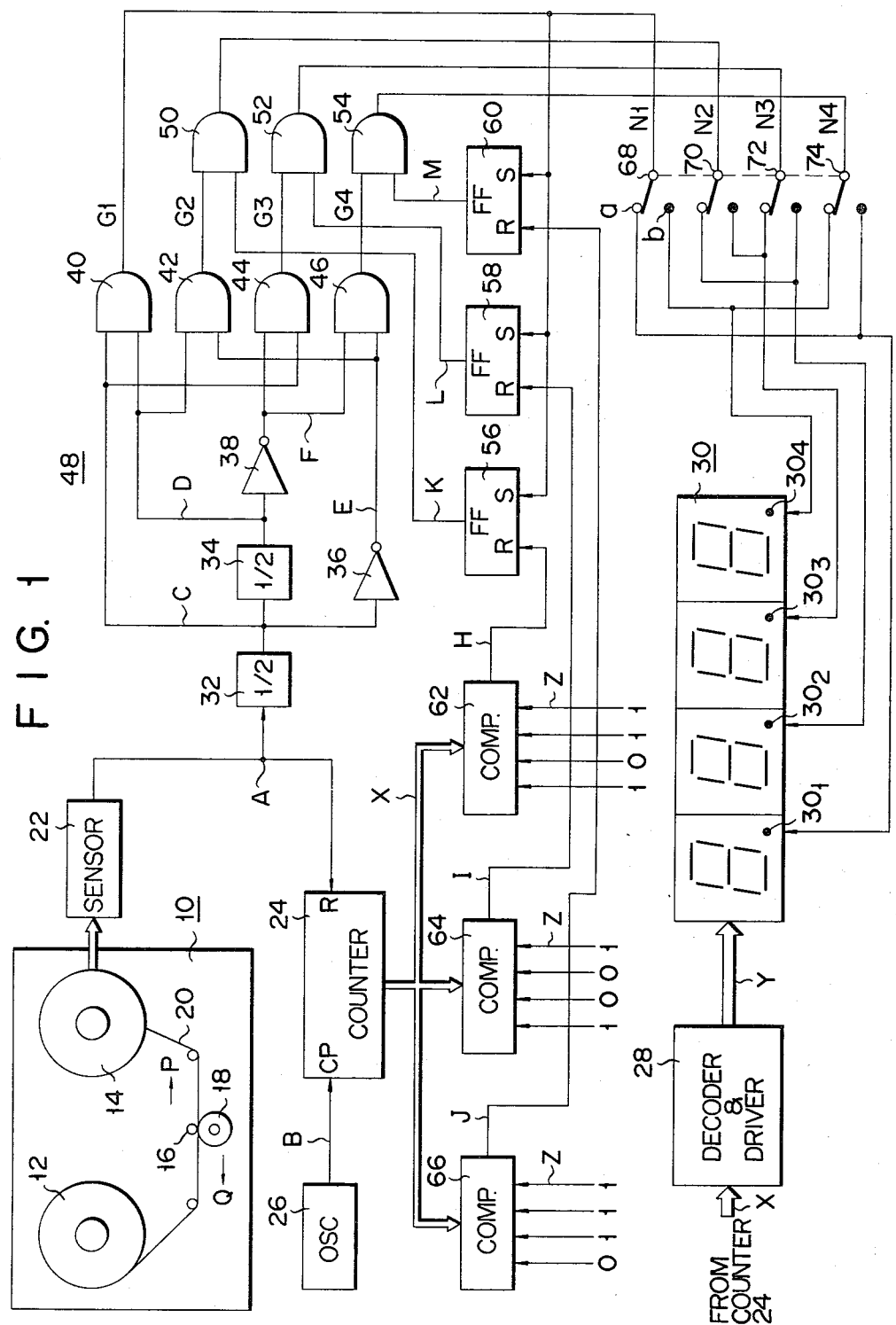
FIG. 1 shows a circuit diagram of an embodiment of an indicator for tape running direction and tape remnant amount according to the invention in which these are indicated in terms of a glint movement.
Figure 1A:
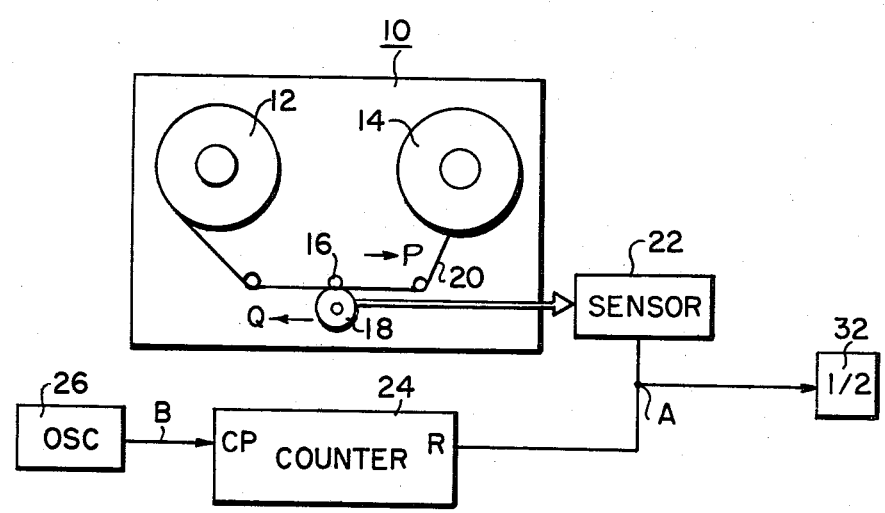
FIG. 1A shows a modified version of part of FIG. 1.
Figure 2A:
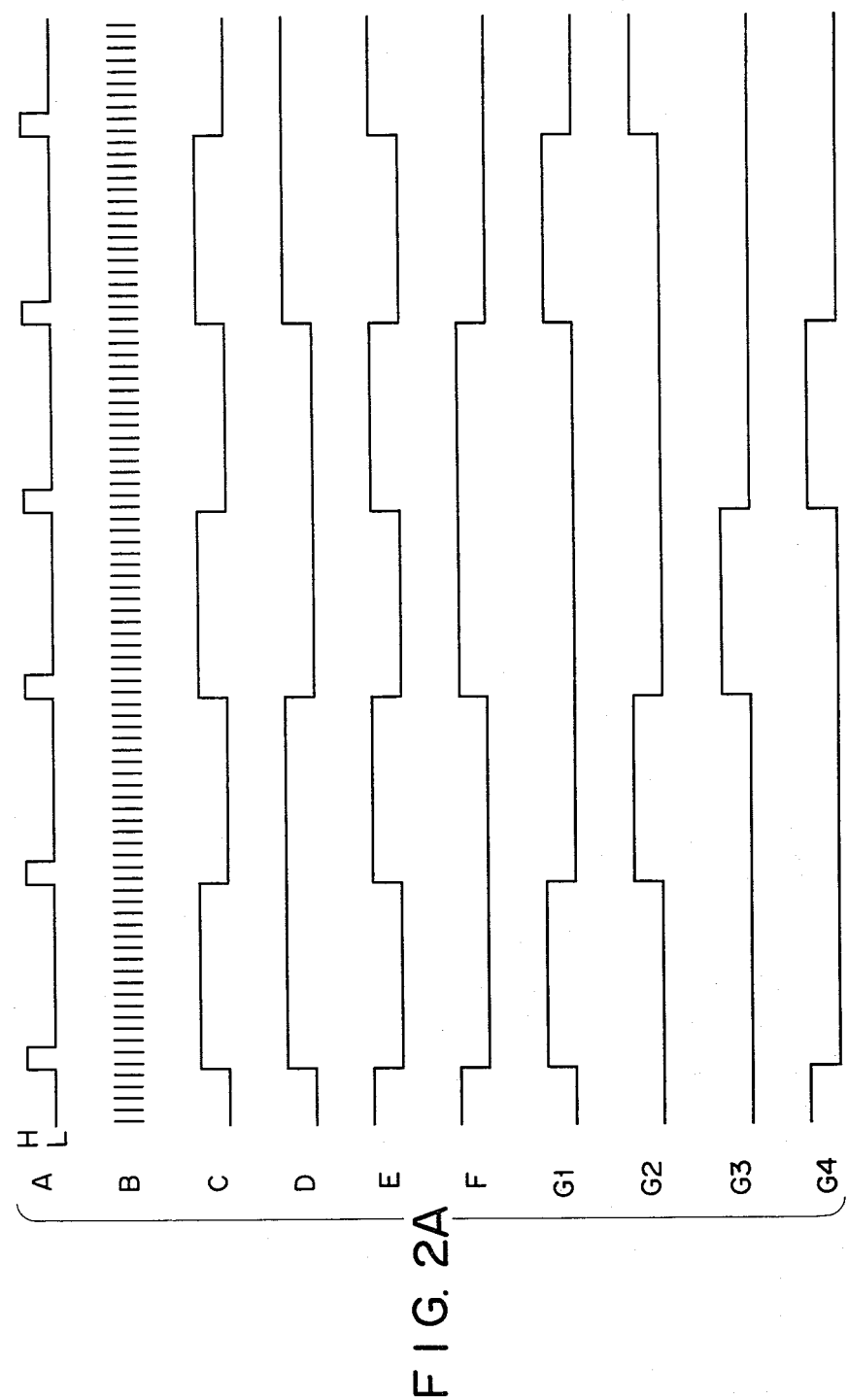
FIGS. 2A and 2B show a set of timing diagrams useful in explaining the operation of the indicator in FIG. 1.
Figure 2B:
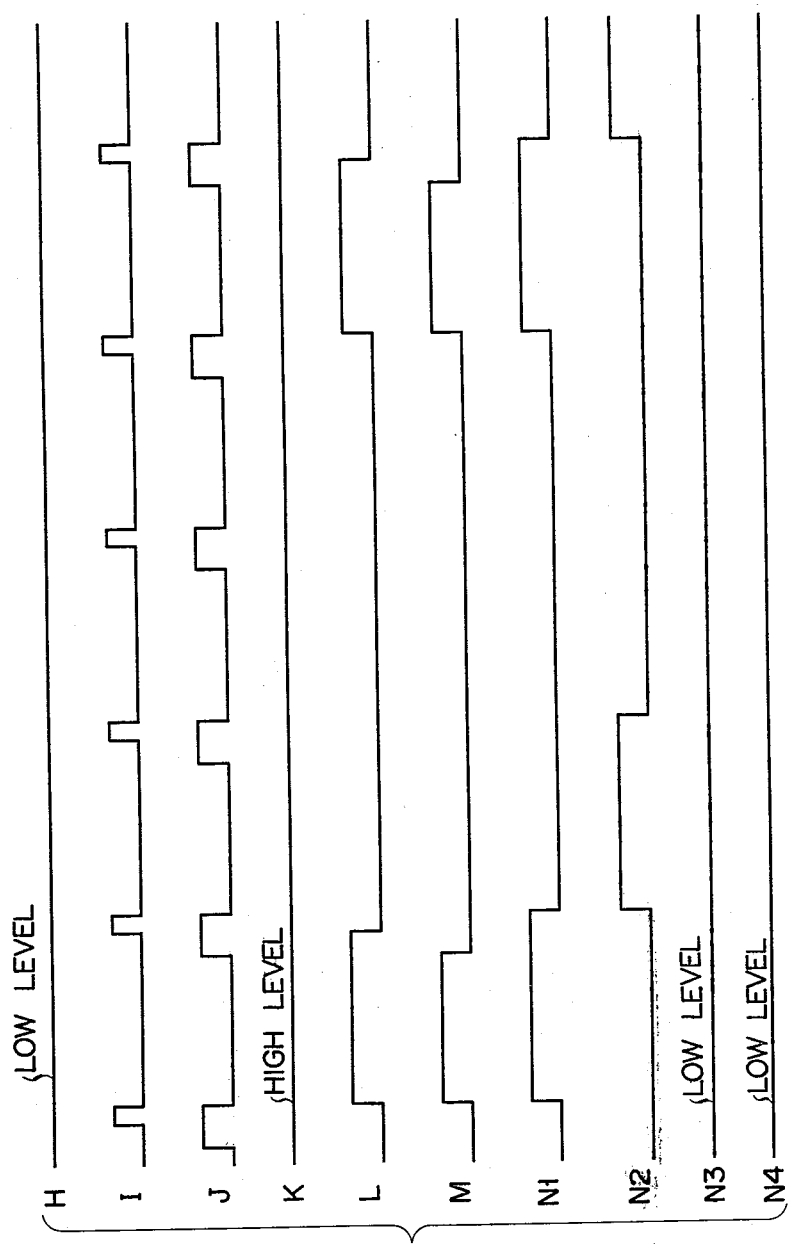

Referring particularly to FIG. 1 illustrating a tape running direction indicator according to the invention, a tape transport 10 is provided with a supply reel 12, a take-up reel 14, a capstan 16 and a pinch roller 18. A recording tape 20 is driven by the capstan 16 and the pinch roller 18 in recording or playback operation, or the tape 20 is driven by a rotation mechanism at the supply reel side or the take-up reel side in rewinding or fast forward operation. A rotation sensor 22 is set at the take-up reel 14. The sensor 22 is a device for generating a signal depending on the rotation of the take-up reel 14 and operates as a sensor for running direction and tape remnant amount. In this example, the sensor 22 generates one pulse once each revolution of the take-up reel 14. As shown in FIG. 1A sensor 22 may also be operated by pinch roller 18.

A sensing signal A derived from the sensor 22 is applied to a reset input terminal R of a counter 24. The counter 24 produces count output signals which are expressed, for example, in BCD code of four digits. To a clock input terminal CP of the counter 24 is applied a clock signal B derived from a clock oscillator 26. The count output signal X of the counter 24 is applied to a decoder/driver 28 where it is converted into an indication signal Y. The indication signal Y provides switching signals for dynamic drive in addition to drive signals for seven segments. The indication signal Y is supplied to a display unit 30 of four digits or four sections, for example.

The display unit 30 can display an amount of the tape running. By way of example, in the recording or playback, when the amount of tape reeled by the take-up reel 14 is small, the rotation speed of the take-up reel 14 is large and therefore, the period of the sensing signal A delivered from the sensor 22 is short. In other words, the period from the initiation of counting of the clock signal B by the counter 24 to the reset of it by the sensing signal A is short. Accordingly, the numeral displayed by the display unit 30 takes a small value. With increase of the tape running amount, the tape take-up amount of the take-up reel 14 increases while the rotation speed of the take-up reel 14 is progressively slower. Upon this, the period from the count initiation of the counter 24 to the reset of it is longer and therefore, the numeral on the display unit 30 becomes larger. In this manner, the display unit 30 operates as a tape counter. The tape couner using the display unit 30 may also be constructed in the following manner. A pulse generator (22) is set on the take-up reel 14 of tape transport 10, which the pulse generator (22) generates a pulse (A) having information of the rotation speed and rotational direction of the take-up reel 14. More particularly, the pulse generator (22) is a sort of generator operating in such a manner that, when the tape 20 runs in a direction of arrow "P", it produces a positive pulse once each revolution of the take-up reel 14 while, when the tape runs in a reverse direction of arrow "Q", it produces a negative pulse once each revolution of the take-up reel 14. The positive and negative pulses generated by the pulse generator (22) are applied to the up-count and down-count inputs of an up/down counter (24), respectively. The count output of the up/down counter (24) is transferred to a 7-segment display section of the display unit 30, through the decoder/driver 28. In the tape counter thus constructed, when the tape 20 is transported in the "P" direction, the numeral on the display unit 30 becomes large as the take-up amount of tape 20 is increased. On the other hand, when the tape 20 travels in the "Q" direction, the numeral on the display unit 30 becomes small with decrease of the tape take-up amount of the take-up reel 14.

The decimal points on the display unit 30 which are usually not used may be utilized for indication of the tape running direction. The circuit to indicate the tape running direction by using the decimal points may be constructed in the following manner. The sensing signal A is applied to ½ frequency dividers 32 and 34 connected in series where it is frequency-divided into ½ and ¼, as shown by wave forms C and D in FIG. 2A. The output signal, i.e. ½ frequency-divided pulse C, of the frequency divider 32 is inverted by an inverter 36 into a pulse E corresponding to the antiphased pulse C. The output signal of the frequency divider 34, i.e. a ¼ frequency divided pulse D is inverted by an inverter 38 into a pulse F which corresponds to the antiphased pulse D. The pulses C and D are inputted into an AND gate 40 and the pulses D and E are inputted to an AND gate 42. The pulses C and F are supplied to an AND gate 44 and the pulses E and F to an AND gate 46. The output signals, i.e. running indication signals G1, G2, G3 and G4 of the AND gates 40, 42, 44 and 46 are logical-processed by the AND gates 40 and 46 to be timing pulses shifted one pulse, as shown by wave forms G1 to G4 in FIG. 2A. The circuit components 32 to 46 constitute a running indication signal generating circuit 48 for indicating the tape running direction. The circuit 48 may be a kind of a ring counter.

The running indication signals G2 to G4 are applied to AND gates 50, 52 and 54, respectively. To these AND gates are applied output signals K, L and M of set/reset flip-flops 56, 58 and 60. These flip-flops are all set by the running indication signal G1 and reset by the output signals H, I and J of comparators 62, 64 and 66, respectively. The counter 24 applies the count output signal X as a comparing signal X to the comparators 62, 64 and 66. BCD code data such as "1011", "1001" and "0111" are applied as reference signals Z to the comparators 62, 64 and 66, respectively.

The output signals of the AND gates 40, 50, 52 and 54 are supplied to the decimal points $30_1$ to $30_4$ in the display unit 30, through switches 68, 70, 72 and 74. In this case, these output signals serve as tape running direction/tape remnant amount indication signals N1 to N4. The switches 68 to 74 are used to switch the indicating operation of the tape running direction and the tape remnant amount. The switches 68 to 74 are electrically and mechanically coupled with a first operation part for executing record/playback, fast forward and cue and a second operation part for executing rewinding and reverse record/playback. For example, when the first operation part is operated, that is to say, the tape 20 is transported in the "P" direction, the contact points "a" of the switches 68 to 74 are selected. At this time, when the AND gates 50 to 54 are all enabled, the running indication signals G1 to G4 are directly applied as the running direction/remnant amount indication signals N1 to N4 to the decimal points $30_1$ to $30_4$. The running indication signals G1 to G4 are pulse signals which are shifted when one pulse of the sensing signal A is produced, as shown by wave forms G1 to G4 in FIG. 2A. Thus, the decimal points are sequentially energized in the order of $30_1$–$30_2$–$30_3$–$30_4$–$30_1$. On the other hand, when the second operation part is operated, that is to say, the tape 20 is transported in the "Q" direction, the contact points "b" of the switches 68 to 74 are selected so that the decimal points are similarly energized in the order of $30_4$–$30_3$–$30_2$–$30_1$–$30_4$.

The explanation thus far described of the glint movement of the decimal points $30_1$ to $30_4$ relates to the case when the AND gates 50 to 54 are all enabled. For example, when the tape transport 10 comprises a mechanism for a microcassette recorder, the rotation speed of the take-up reel 14 at the start of the winding is approximately 0.6 rps (revolution per second). In this case, if the oscillating frequency of the oscillator 26 is 4.4 Hz, for example, the number of clock pulses inputted to the counter 24 becomes 4.4/0.6~7 during the time period from releasing of the reset state of the counter 24 till the counter 24 is again reset, at the initial stage of the taking up of the tape. One of those pulses corresponds to a reset pulse period so that the count output X of the counter 24 is "6" in decimal number, or "0110" in BCD code. Note here that ±1 of count error peculiar to the digital counter is neglected. As previously stated, the reference signals Z for the comparators 66, 64 and 62 are "0111", "1001" and "1011". These reference signals Z are larger than the count output "0110" applied to the comparators 62, 64, and 66. Therefore, at the initial stage of the tape take-up of the microcassette recorder, the AND gates 50 to 54 are all fully conducted.

When the amount of the tape reeled by the reel 14 increases and the rotation speed of the reel 14 becomes slow, the period between which the counter 24 is reset by the sensing signal A is prolonged and hence the count output X of the counter 24 also becomes large.

Assume now that the amount of the tape reeled increases and the count output X of the counter 24 becomes "1010", for example. In other words, the comparing signal X for the comparators 62 to 66 is "1010". The comparing signal "1010" is larger than the reference signals "0111" and "1001" for the comparators 66 and 64 but is smaller than the reference signal "1011" for the comparator 62. Accordingly, when the count output X of the counter 24 is "1010", the flip-flops 58 and 60 are reset by the output signals I and J as shown by wave forms I and J in FIG. 2B. At this time, the AND gates 52 and 54 are disabled by the output signals L and M which are at low level, as shown by wave forms L and M in FIG. 2B, during the period between which the signals G3 and G4 at high level ae inputted. (see, together with FIGS. 2A and 2B) On the other hand, the flip-flop 56 is not reset so that the AND gate 50 is fully conducted.

When the AND gates 52 and 54 are disabled, only the signals G1 and G2 are applied as the running direction/remnant amount indication signals N1 and N2 to the decimal points $30_1$ and $30_2$ of the display unit 30. That is, the decimal points $30_1$ and $30_2$ are energized by the pulse signals shifted as shown by wave forms N1 and N2 in FIG. 2B. In other words, the glint decimal points are shifted in the order of $30_1$-$30_2$-$30_1$-$30_2$.

Assume now that the amount of the tape reeled increases to be at maximum, that is, the remant amount of the tape approximates to zero, and the count output X of the counter 24 becomes "1100" or more. Under this condition, the flip-flops 56 to 60 are all reset and the AND gates 50 to 54 are all disabled. At this time, only the running indication signal G1 is applied as the running direction/remnant amount indication signal N1 to the decimal point $30_1$. In other words, when the tape remnant amount approximates to zero is zero, only the decimal point $30_1$ flashes.

Figure 3:
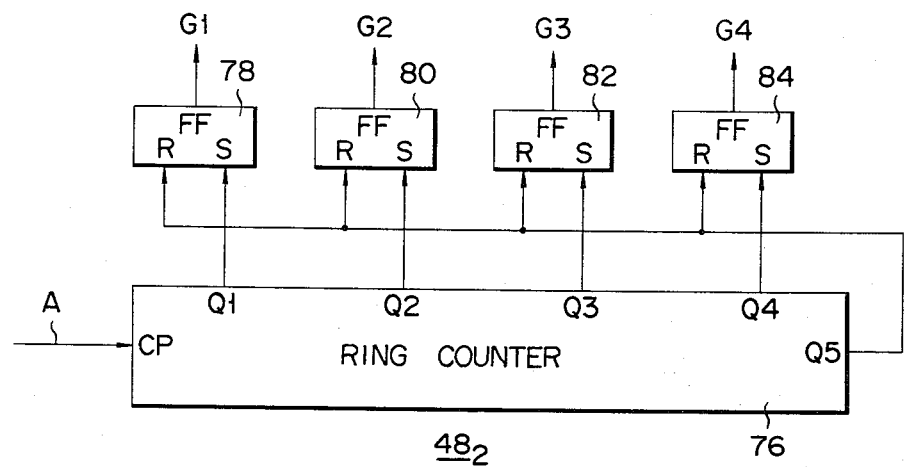
FIG. 3 shows a circuit diagram of a circuit corresponding to the circuit 48 in which the tape running direction and tape remnant amount are indicated in terms of change of a dotted line length.
Figure 4:
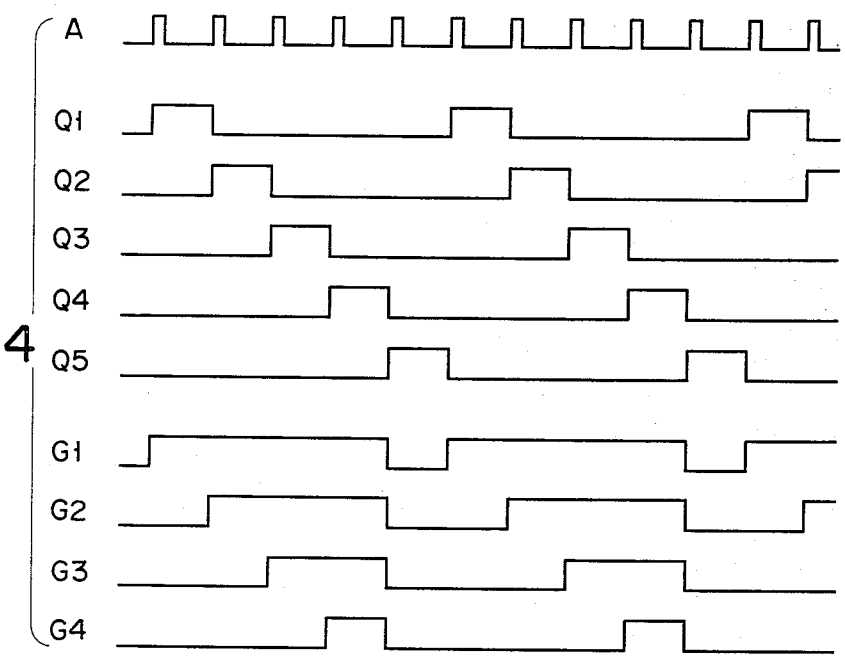
FIG. 4 shows a set of timing diagrams of illustrating the operation of the circuit in FIG. 3.

FIG. 3 shows another example in which the tape running direction and the tape remnant amount are indicated by means of the display unit 30 in a manner different from that in FIG. 1. As shown, the sensing signal A is applied as a clock pulse to a ring counter 76 of 5 bits. The output terminals Q1 to Q4 of the ring counter 76 are coupled with the set input terminals of the set/reset flip-flops 78 to 84, respectively, and the output terminal Q5 of the counter 76 is coupled with the input terminals of the flip-flops 78 to 84. Pulse signals appearing at the output terminals Q1 to Q5 of the counter 76 are shifted each pulse of the sensing signal A as shown by wave froms A and Q1 to Q5 in FIG. 4. The flip-flops 78 to 84 are successively set by the output pulses from the output terminals Q1 to Q4 of the counter 76 and are all reset by the pulse signal of the output terminal Q5. The running indication signals G1 to G4 derived from the flip-flops 78 to 84 take wave shapes as shown G1 to G4 in FIG. 4.

By the running direction/remnant amount indication signals N1 to N4 obtained from such running indication signals G1 to G4 are driven the decimal points $30_1$ to $30_4$. Upon the drive, the glints of the decimal points $30_1$ to $30_4$ change in such a manner that the number of energized decimal points, i.e. glints, is increased in the tape running direction. In other words, a dotted line consisting of energized decimal points, or glints, changes its length in the tape running direction. Let us consider a case where the amount of the tape reeled is small and the flip-flops 56 to 60 are not reset. In this case, the first pulse of the sensing signal A causes to light only the decimal point $30_1$. The second pulse leads to light the decimal points $30_1$ and $30_2$, the third pulse the decimal points $30_1$ to $30_3$ and the fourth pulse all the decimal points $30_1$ to $30_4$. The fifth pulse extinguishes all the decimal points $30_1$ to $30_4$. The pulses following the sixth pulses repeat the above operation. In this case, the dotted line length is $30_1 + 30_2 + 30_3 + 30_4$ at maximum.

As the tape remnant amount decreases and the flip-flops 58 and 60 are reset, the dotted line length becomes $30_1 + 30_2$. When the tape remnant amount further decreases to approximately zero, the flip-flops 56 to 60 are all reset. At this time, only the decimal point $30_1$ flickers.

In either cases of FIG. 1 or 3, the indication of the tape running direction may be changed by means of switches 68 to 74.

Figure 5:
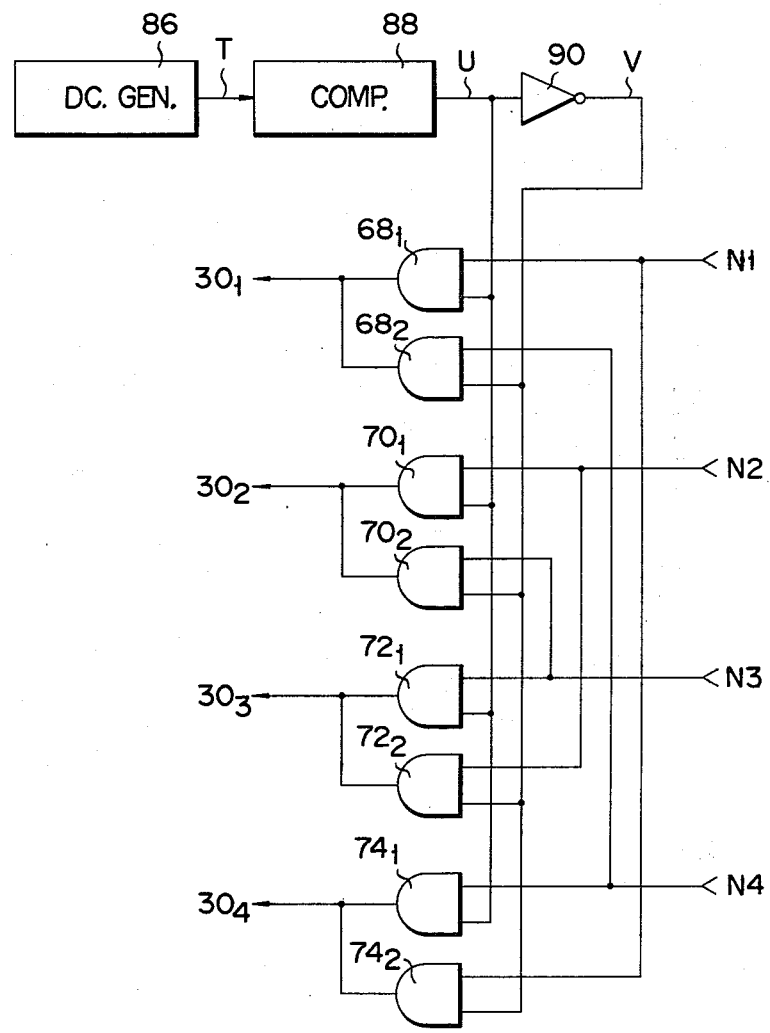
FIG. 5 shows a circuit diagram of a circuit corresponding to the switches 68 to 74 shown in FIG. 1, in which the indication of the tape running direction is electronically changed depending on the running direction of the tape in a tape transport.

In the examples in FIGS. 1 and 3, the switches 68 to 74 are switched corresponding to the operation of the tape transport 10. However, the switches 68 to 74 may also be operated depending on the rotational direction of the take-up reel 14 (or the supply reel 12). Assume now that a DC generator 86 is directly coupled with the axis of the take-up reel 14. As shown in FIG. 5, an output potential T of the generator 68 is positive or negative depending upon the rotational direction of the generator 86. The polarity of the potential T is judged by a comparator 88. In connection with the polarity judgement, the polarity is set up positive when the tape 20 runs in the "P" direction in the tape transport 10, and it is set up negative when the tape runs in the opposite direction, i.e. "Q" direction. An output gate signal U of the comparator 88 is at high level when the potential T is positive while it is at low level when the potential T is negative. The gate signal U is converted by an inverter 90 into a gate signal V which is the phase-inverted signal U.

The switches 68 to 74 may be substituted for the AND gates 68 to 74, respectively. In this case, the running direction/remnant amount indication signal N1 is applied to first input terminals of the AND gates $68_1$ and $74_2$. Similarly, the indication signal N2 is applied to first input terminals of the AND gates $70_1$ and $72_2$; the signal N3 to first input terminals of the AND gates $72_1$ and $70_2$; the signal N4 to first input terminals of the AND gates $74_1$ and $68_2$. The output signals of the AND gates $68_1 + 68_2$, $70_1 + 70_2$, $72_1 + 72_2$ and $74_1 + 74_2$ are transferred to the decimal points $30_1$, $30_2$, $30_3$ and $30_4$ of the display unit 30, respectively. The gate signal U is applied to the second input terminals of the AND gates $68_1$, $70_1$, $72_1$ and $74_1$ and the gate signal V to the second terminals of the AND gates $68_2$, $70_2$, $72_2$ and $74_2$.

In the operation of thus constructed switch gate, when the tape 20 travels in the "P" direction in the tape transport 10, if the gate signal U reaches a high level, the AND gates $68_1, 70_1$, $72_1$ and $74_1$ are enabled. At this time, the gate signal V is at low level so that the AND gates $68_2$, $70_2$, $72_2$ and $74_2$ are disabled. With this circuit connection, the indication signals N1 to N4 are supplied to the decimal points $30_1$ and $30_4$, respectively. When the tape 20 travels in the "Q" direction, the AND gates $68_2$ to $74_2$ are enabled and the AND gates $68_1$ to $74_1$ are disabled. Accordingly, at this time, the indication signal N1 to N4 are supplied to the decimal points $30_4$ to $30_1$, respectively.

The embodiments thus far described employ the decimal points in the display unit 30 for the indications of the tape running direction and the tape remnant amount. However, a part or all of the seven segments for numeral display in the display unit 30 may be used for the indications. For example, the numerals displayed by the display unit 30 are flashed and the flashing of the numerals displayed are shifted as the tape runs.

The sensor 22 may also be set at the supply reel 12 side. In this case, the period of the sensing signal A is longer as the tape remnant amount is larger. Accordingly, when it is desired to gain similar effects of FIG. 1 with such an arrangement, the output signals K, L and M of the flip-flops 56, 58 and 60 are phase-inverted and the reference signals of the comparators 66 and 62 are exchanged.

Means for providing the sensing signal A corresponding to the tape running further includes the following devices, for example.

(1) a mechanical switch which is turned on or off corresponding to the rotation of the take-up reel 14.

(2) a photointeruptor in which an optical path is interrupted corresponding to the rotation of the take-up reel 14.

(3) a semiconductor hall element or a magnetic head to detect change of the magnetic field developed by a magnet which rotates in synchronism with the take-up reel 14.

Although specific circuit constructions have been illustrated and described herein, it is not intended that the invention be limited to the elements and circuit constructions disclosed. One skilled in the art will recognize that the particular elements or subcircuits may be used without departing from the scope and spirit of the invention.

What is claimed is:

1. An indicator for tape running direction and tape remnant amount comprising:
   a tape transport;
   display means in which a plurality of digit display sections including display elements are arranged side by side;
   sensing means coupled to said tape transport for providing a sensing signal corresponding to the rotation of a tape reel;
   running indication signal generating means operatively connected to said sensing means for sequentially generating running indication signals corresponding to a tape running direction on the basis of the sensing signal;
   gate circuit means in which at least one running indication signal corresponding to the amount of tape remnant is selected and, upon the selection, tape running direction/tape remnant amount indication signals are sequentially produced;
   drive means for driving at least one display element for each digit display section in accordance with the tape running direction/tape remnant amount indication signals in order to indicate the tape running direction and the tape remnant amount by means of said display means;
   counter means for counting a clock signal to make a count corresponding to tape running and adapted to be reset by the sensing signal; and
   comparing means in which a count output of said counter means and reference data corresponding to the fixed tape remnant amount are compared and the selection operation of said gate circuit means is controlled on the basis of the result of the comparison.

2. An indicator for tape running direction and tape remnant amount according to claim 1, further comprising switching means for changing, corresponding to tape running direction, the order in which said gate circuit means provides tape running direction/type remnant amount indication signals to the digit display sections in order to change the direction of tape running direction/tape remnant amount indication.

3. An indicator for tape running direction and tape remnant amount according to claim 2, wherein said switching means comprises a switch with a plurality of contacts which is switched interlocking with a mechanism in said tape transport.

4. An indicator for tape running direction and tape remnant amount according to claim 2, wherein said switching means comprises a gate circuit controlled by an electrical signal changing corresponding to the tape running direction.

5. An indicator for tape running direction and tape remnant amount according to claim 1, in which said display means is a tape counter for displaying the tape runnning amount and has decimal points in the digit display sections for indicating the tape running direction and the tape remnant amount.

6. An indicator for tape running direction and tape remnant amount according to claim 1, wherein said gate circuit means is coupled with said running indication signal generating means, and the display elements are sequentially energized by the tape running direction/tape remnant amount indication signals shifted one by one in order that the energization of the display element is progressively shifted in a direction corresponding to the tape running direction.

7. An indicator for tape running direction and tape remnant amount according to claim 6, in which said running indication signal generating means comprises a ring counter clocked each period of the sensing signal.

8. An indicator for tape running direction and tape remnant amount according to claim 1, wherein said gate circuit means is coupled with said running indication signal generating means, and the respective display elements are accumulatively energized by the tape running direction/tape remnant amount indication signals, said signals having pulse widths which change for each pulse in such a manner that the pulse widths are successively elongated in order that the energization of the display elements are progressively extended in a direction corresponding to the tape running direction.

9. An indicator for tape running direction and tape remnant amount according to claim 8, in which said running indication signal generating means is comprised of a ring counter with output terminals of which the number is at least one larger than the number N of the digit display sections, and N set/reset flip-flops for providing N running indication signals to the respective digit display sections in which said flip-flops are sequentially set by the output pulses derived from the 1st to Nth output terminals of said ring counter and are all reset by the output pulse from the (N+1)th output terminal thereof.

10. An indicator for tape running direction and tape remnant amount according to claim 1, in which said sensing means produces an electrical signal with a period corresponding to the tape running speed in order that the energization of the display elements is performed at a rate corresponding to the tape running speed.

11. An indicator for tape running direction and tape remnant amount according to claim 10, in which said sensing means comprises a switch element turned on and off interlocking with a roller rotating in contact with the tape.

12. An indicator for tape running direction and tape remnant amount according to claim 10, in which said sensing means comprises a generator element coupled with a roller rotating in contact with the tape.

13. An indicator for tape running direction and tape remnant amount according to claim 1, wherein said sensing means produces an electrical signal with a period corresponding to the rotational speed of a tape reel in order that the energization of the display elements is performed at a rate corresponding to the amount of the tape reeled by the tape reel.

14. An indicator for tape running direction and tape remnant amount according to claim 13, in which said sensing means comprises a switch element turned on and off interlocking with the tape reel.

15. An indicator for tape running direction and tape remnant amount according to claim 13, wherein said sensing means comprises a generator element coupled with an axis of the tape reel.

16. An indicator for tape running direction and tape remnant amount according to claim 1, wherein said sensing means comprises a clock oscillator for generating an electrical signal with a fixed period, as the sensing signal.

17. An indicator for tape running direction and tape remnant amount according to claim 1, wherein said gate circuit means includes; (N−1) AND gates which receive at the first input terminals the 2nd to Nth running indication signals in the running indication signals of N and produces the tape running direction/tape remnant amount indication signals of 2nd to Nth; and (N−1) flip-flops which are set by the first running indication signal and are reset by the result of comparing by said comparing means and apply the output signals to the second input terminals of said (N−1) AND gates.

* * * * *